United States Patent
Xu

(10) Patent No.: US 9,430,529 B2
(45) Date of Patent: Aug. 30, 2016

(54) TECHNIQUES FOR INCREMENTALLY UPDATING AGGREGATION OF STATES

(75) Inventor: Qing (Rick) Xu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/307,760

(22) Filed: Nov. 30, 2011

(65) Prior Publication Data

US 2013/0138602 A1     May 30, 2013

(51) Int. Cl.
    *G06F 17/30*             (2006.01)
    *G06F 7/00*               (2006.01)

(52) U.S. Cl.
    CPC .............................. *G06F 17/30489* (2013.01)

(58) Field of Classification Search
    None
    See application file for complete search history.

(56) References Cited

U.S. PATENT DOCUMENTS

| | | | |
|---|---|---|---|
| 5,832,519 | A | 11/1998 | Bowen et al. |
| 6,438,538 | B1 | 8/2002 | Goldring |
| 7,882,087 | B2 | 2/2011 | Johnson |
| 2004/0193626 | A1 | 9/2004 | Colby et al. |
| 2006/0294129 | A1* | 12/2006 | Stanfill et al. ............... 707/102 |
| 2007/0094384 | A1* | 4/2007 | Matsumura et al. ......... 709/224 |
| 2008/0126856 | A1* | 5/2008 | Levidow et al. ............... 714/19 |
| 2011/0137875 | A1 | 6/2011 | Ziauddin et al. |

OTHER PUBLICATIONS

Ahmed, How to Find and Track Your Past Likes on Facebook, May 4, 2011, www.oxhow.com/how-to-find-and-track-your-past-likes-on-facebook.*

Chaudhuri, et al., "An Overview of Data Warehousing and OLAP Technology", Retrieved at <<http://www.cs.sfu.ca/cc/459/han/papers/chaudhuri97.pdf>>, ACM SIGMOD International Conference on Management of Data, vol. 26, Issue 1, Mar. 1997, pp. 64-74.

Agarwal, et al., "Materialization and Incremental Update of Path Information", Retrieved at <<http://ieeexplore.ieee.org/stamp/stamp.jsp?tp=&arnumber=47238>>, Fifth International Conference on Data Engineering, Feb. 6-10, 1989, pp. 374-383.

Ester, et al., "Incremental Clustering for Mining in a Data Warehousing Environment", Retrieved at <<http://www.dbs.informatik.uni-muenchen.de/Publikationen/Papers/VLDB-98-IncDBSCAN.pdf>>, Proceedings of the 24rd International Conference on Very Large Data Bases, Aug. 24-27, 1998, pp. 323-333.

* cited by examiner

*Primary Examiner* — Usmaan Saeed
*Assistant Examiner* — Yu Zhao
(74) *Attorney, Agent, or Firm* — Aneesh Mehta; Kate Drakos; Micky Minhas

(57) ABSTRACT

Methods, systems, and computer program products are provided for generating and updating an aggregation of data states. The aggregation of data states is selectively updated by updating an affected slice of the aggregation of data states. The aggregation of data states is replaced by a new aggregation of data states created from a selective subset of detailed data state data, by adding new aggregations and deleting existing aggregations.

16 Claims, 6 Drawing Sheets

TECHNIQUES FOR INCREMENTALLY UPDATING AGGREGATION OF STATES

BACKGROUND

Various database applications exist, such as data warehouses used for reporting and analysis. In a database application, an aggregation of a data states may be generated, and may need to be updated from time to time. When the aggregated data is a snapshot of the final state of some detailed data, the detailed data is updated in an on-going manner, and a detailed log of changes to the detailed data is not fully available, typical techniques calculate the aggregation of the data states from scratch, which is a waste of resources. As the volume of detailed data grows larger and larger, this calculation takes more and more time to be performed. In some cases, servers performing the calculation may encounter a lack of memory resources, and the calculation fails.

Another technique for determining the aggregation of data states is to periodically update the aggregation data state by some delta values. For instance, delta values may be determined by counting data state changes (e.g., −10, 8, 5, etc.) that occur during some time period, and the counted data state changes may be added an older version of the aggregation of data states to generate the final version of the aggregation of data states. However, this technique applies to a situation where a complete log of data changes is available. Such a complete log maintains full track of every change that the user(s) made, including new events, deleted events, and updated events. However, in some situations, such a complete log cannot be maintained, or is not accessible, and therefore cannot be used to determine the aggregation of data states.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for generating and updating an aggregation of data states. The aggregation of data states may be initially generated based on final state information for the data during a time period and on change of state information for the data during the time period. The aggregation of data states may be selectively updated by updating an affected slice of the aggregation of data states. The aggregation of data states is replaced by a new aggregation of data states created from a selective subset of detailed data state data, by adding new aggregations and deleting existing aggregations.

In one implementation, a method for generating and/or updating an aggregation of data states is provided. For a first time period, a last data dataset (U) is received that includes a plurality of last data states vectors. Each last data state vector includes a data state value indicating a set state, a time at which the set state was indicated, and a dimension vector that identifies a user and a target object that was tagged with the set state by the user. A detailed data dataset (V) is generated that includes all of the last data state vectors of the last data dataset as detailed data vectors. A final aggregated data dataset (A) is generated that includes one or more final aggregated data vectors corresponding to any detailed data vectors included in the detailed data dataset. Each final aggregated data vector includes a dimension vector that matched the dimension vector of a corresponding detailed data vector and a counted number of occurrences of set states for the dimension vector in the detailed data dataset.

Furthermore, in a next time period, the last data dataset (U) is received. The last data dataset includes a plurality of last data states vectors corresponding to the next time period. A deleted data dataset (L) is received that includes a plurality of deleted data states vectors. Each deleted data state vector includes a data state value indicating a deleted state, a time at which the deleted state was indicated, and a dimension vector that identifies a user and a target object that was tagged with the deleted state by the user. Any detailed data vectors that include a dimension vector matching a dimension vector of the deleted data dataset is/are deleted from the detailed data dataset (V). Any last data state vectors of the last data dataset that do not include a dimension vector matching a dimension vector already included in the detailed data dataset is/are added to the detailed data dataset (V) as detailed data vectors. A dimension vector set (D) is generated to include all dimension vectors of the last data dataset and all dimension vectors of the deleted data dataset. A non-final aggregated data dataset (G) is generated to include one or more non-final aggregated data vectors corresponding to any detailed data vectors included in the detailed data dataset that have a dimension vector that matches a dimension vector in the dimension vector set. Each non-final aggregated data vector includes a dimension vector that matched a dimension vector in the dimension vector set and a counted number of occurrences of set states for the dimension vector in the detailed data dataset. Any final aggregated data vectors that do not include a dimension vector that matches a dimension vector of a non-final aggregated data vector in the non-final aggregated data dataset is/are deleted from the final aggregated data dataset (A). The counted number of occurrences of set states in a final aggregated data vector of the final aggregated data dataset (A) is replaced by the counted number of occurrences of set states in a corresponding non-final aggregated data vector of the non-final aggregated data dataset (G) when the final aggregated data vector includes a dimension vector that matches a dimension vector of the corresponding non-final aggregated data vector. Any non-final aggregated data vectors of the non-final aggregated data dataset (G) that do not include a dimension vector that matches a dimension vector of a final aggregated data vector in the final aggregated data dataset is/are added to the final aggregated data dataset (A).

In another implementation, a system for generating and/or updating an aggregation of data states is provided. The system includes a first vector inserter and a dataset aggregator. For a first time period, the first vector inserter receives a last data dataset (U) that includes a plurality of last data states vectors. Each last data state vector includes a data state value indicating a set state, a time at which the set state was indicated, and a dimension vector that identifies a user and a target object that was tagged with the set state by the user. The first vector inserter generates a detailed data dataset (V) that includes all of the last data state vectors of the last data dataset as detailed data vectors. The dataset aggregator generates a final aggregated data dataset (A) that includes one or more final aggregated data vectors corresponding to any detailed data vectors included in the detailed data dataset. Each final aggregated data vector includes the dimension vector of a corresponding detailed data vector and a counted number of occurrences of set states for the dimension vector in the detailed data dataset.

Furthermore, the system may include a first vector remover, a dimension set generator, a second vector remover, a count value replacer, and a second vector inserter. For a next time period, the first vector inserter receives the last data dataset (U) that includes a plurality of last data states vectors corresponding to the next time period. The first vector remover receives a deleted data dataset (L) that includes a plurality of deleted data states vectors. Each deleted data state vector including a data state value indicating a deleted state, a time at which the deleted state was indicated, and a dimension vector that identifies a user and a target object that was tagged with the deleted state by the user. The first vector remover deletes from the detailed data dataset (V) any detailed data vectors that include a dimension vector matching a dimension vector of the deleted data dataset. The first vector inserter adds to the detailed data dataset (V) as detailed data vectors any last data state vectors of the last data dataset that do not include a dimension vector matching a dimension vector already included in the detailed data dataset. The dimension set generator generates the dimension vector set (D) to include all dimension vectors of the last data dataset and all dimension vectors of the deleted data dataset. The dataset aggregator generates a non-final aggregated data dataset (G) to include one or more non-final aggregated data vectors corresponding to any detailed data vectors included in the detailed data dataset that have a dimension vector that matches a dimension vector in the dimension vector set. Each non-final aggregated data vector including a dimension vector that matched a dimension vector in the dimension vector set and a counted number of occurrences of set states for the dimension vector in the detailed data dataset. The second vector remover deletes from the final aggregated data dataset (A) any final aggregated data vectors that do not include a dimension vector that matches a dimension vector of a non-final aggregated data vector in the non-final aggregated data dataset. The count value replacer replaces the counted number of occurrences of set states in a final aggregated data vector of the final aggregated data dataset (A) by the counted number of occurrences of set states in a corresponding non-final aggregated data vector of the non-final aggregated data dataset (G) when the final aggregated data vector includes a dimension vector that matches a dimension vector of the corresponding non-final aggregated data vector. The second vector inserter adds to the final aggregated data dataset (A) any non-final aggregated data vectors of the non-final aggregated data dataset (G) that do not include a dimension vector that matches a dimension vector of a final aggregated data vector in the final aggregated data dataset.

Computer program products containing computer readable storage media are also described herein for generating and updating an aggregation of data states, as well as for additional embodiments.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
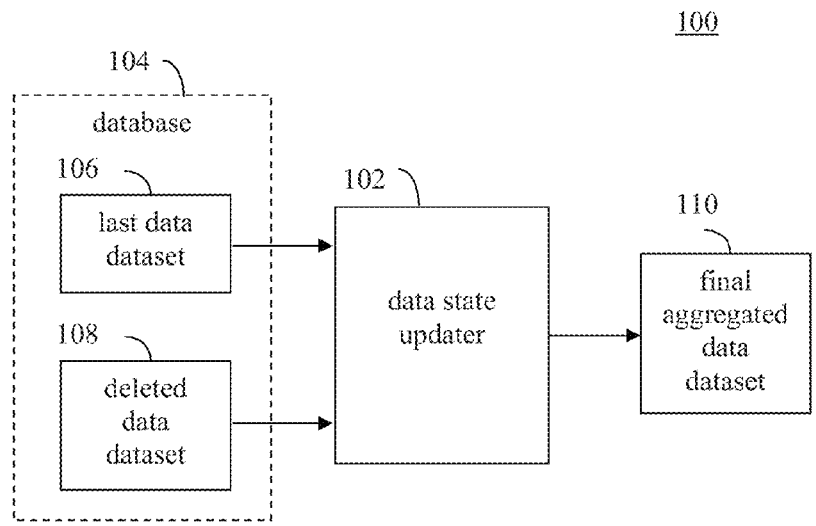
FIG. 1 shows a block diagram of a data state updating system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It noted that any section/subsection headings provided herein are not intended to be limiting. Embodiments are described throughout this document, and any type of embodiment may be included under any section/subsection.

II. Example Embodiments

In database applications, an aggregation of data states may be generated, and may need to be updated from time to time. For example, a social network or other entity may track "like" indications on online objects, such as links (e.g., URLs (uniform resource locators)), images (e.g., image files), video objects, audio objects, person objects, textual objects, etc. A user that likes an online object may click on a "like" button or other user interface element associated with the online object to indicate that the user likes the object. Any number of users may indicate that they "like" a particular online object, and any number of online objects may have "like" buttons (or other user interface elements) associated with them. After a user indicates that the user "likes" an online object, the user may subsequently decide that they no longer like the online object, and may click on an "unlike" button or other user interface element to withdraw (e.g., delete) their "like" indication for the online object. Entities associated with online objects may be interested in receiving the numbers of users that "like" and/or "unlike" their online objects for marketing research and/or other purposes. This like/unlike numbers/statistics may be used by the entities to better design, market, and/or advertise their products and services to customers, among other uses.

Because the data states may change over time (e.g., new "likes" and/or "dislikes" for an online object), an aggregation of the data states for online objects may need to be updated from time to time to track these changes. One technique for determining the aggregation of the data states is to periodically recalculate the aggregation of the data states from scratch, which is a waste of resources, and becomes more burdensome as the volume of detailed data grows larger and larger. Another technique for determining the aggregation of data states is to periodically update the aggregated data state by some delta values. However, this technique only applies to a situation where a complete log of data changes is available that maintains a full track of every change that the user(s) made, including new events, deleted events, and updated events In embodiments, techniques for generating and updating an aggregation of data states are provided. The aggregation of data states may be selectively updated by updating an affected slice of the aggregation of data states. The aggregation of data states may be replaced by a new aggregation of data states created from a selective subset of detailed data state data, by adding new aggregations and deleting existing aggregations.

For example, in an embodiment, two sets of data states may be obtained: (a) a final subset of the data states that includes the final state values of data states that changed during a last time period, and (b) a deletion subset of all of the data states the indicates all of the data state changes to a deleted state occurring in the last time period. For instance, a data state for an online object may have started in a state A, then switched to a state B, then switched back to state A, and then switched back to state B. In such an example, the final subset of the data states (a) may include the final state B for the online object, and the deletion subset of the data states (b) may include the intermediate data state changes of state A, state B, and state A, or may just include the intermediate data state changes that are deletions/removals of the second state B—the state change from state B to state A. Embodiments may determine an updated aggregation of data states based on these final and deletion subsets, while conventional techniques are not capable of determining an updated aggregation of data states based on just these final and deletion subsets.

As such, when a full change log of states is not available, embodiments can update the data state aggregation selectively by updating the affected slice of aggregation of data states. Such an embodiment performs much better than the aggregating-all-over-again from scratch technique that is very common in practice. A data state aggregation is replaced by a new aggregation created from a selective subset of detailed data, adding new aggregations, and deleting aggregations. As such, in embodiments, it is not necessary to maintain a full change log Embodiments may be implemented in a variety of environments. For instance, FIG. 1 shows a block diagram of a data state updating system 100 that includes a data state updater 102 used to automatically update an aggregation of data states, according to an example embodiment. As shown in FIG. 1, data state updater 102 receives a last data dataset 106 and a deleted data dataset 108. As shown in FIG. 1, last data dataset 106 and deleted data dataset 108 may be stored in, and received from a database 104. Last data dataset 106 includes the final versions of data states that changed during a last time period, and deleted data dataset 108 includes any deletions in data states occurring in the last time period. In a first iteration of last data dataset 106 and deleted data dataset 108 (during a first time period of data state aggregation), data state updater 102 processes last data dataset 106 and deleted data dataset 108 to generate a final aggregated data dataset 110. During subsequent iterations of last data dataset 106 and deleted data dataset 108 (following the first time period), data state updater 102 processes last data dataset 106 and deleted data dataset 108 to generate an updated version of final aggregated data dataset 110. Final aggregated data dataset 110 includes the aggregation of data states for a database application (e.g., a social network, etc.).

Figure 2:
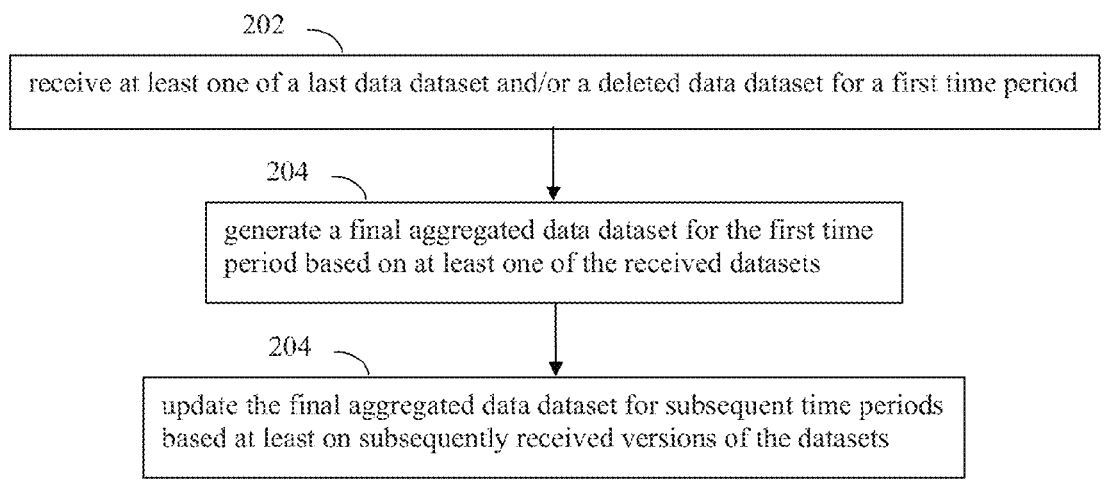
FIG. 2 shows a flowchart providing a process for incrementally updating an aggregation of data states, according to an example embodiment.

Data state updater 102 may be configured to perform its functions in various ways. For instance, FIG. 2 shows a flowchart 200 providing a process for automatically updating an aggregation of data states, according to an example embodiment. In an embodiment, flowchart 200 may be performed by data state updater 102 of FIG. 1. Further structural and operational embodiments will be apparent to persons skilled in the relevant art(s) based on the following discussion regarding flowchart 200.

Flowchart 200 begins with step 202. In step 202, a last data dataset and a deleted data dataset are received for a first time period. For example, as shown in FIG. 1, data state updater 102 receives last data dataset 106 and deleted data dataset 108.

In step 204, a final aggregated data dataset is generated for the first time period based on the received datasets. In a first time period of data state aggregation, data state updater 102 may process last data dataset 106 and/or deleted data dataset 108 to generate a first version of final aggregated data dataset 110. For example, in one embodiment, data state updater 102 may generate final aggregated data dataset 110 based just on last data dataset 106. In such an embodiment, deleted data dataset 108 may not be received in step 202, or if received, may be ignored.

In step 206, the final aggregated data dataset is updated for subsequent time periods based at least on subsequently received versions of the datasets. In embodiments, during subsequent iterations of last data dataset 106 and deleted data dataset 108 (following the first time period), data state updater 102 processes last data dataset 106 and deleted data dataset 108 to generate an updated version of final aggregated data dataset 110.

Figure 3:
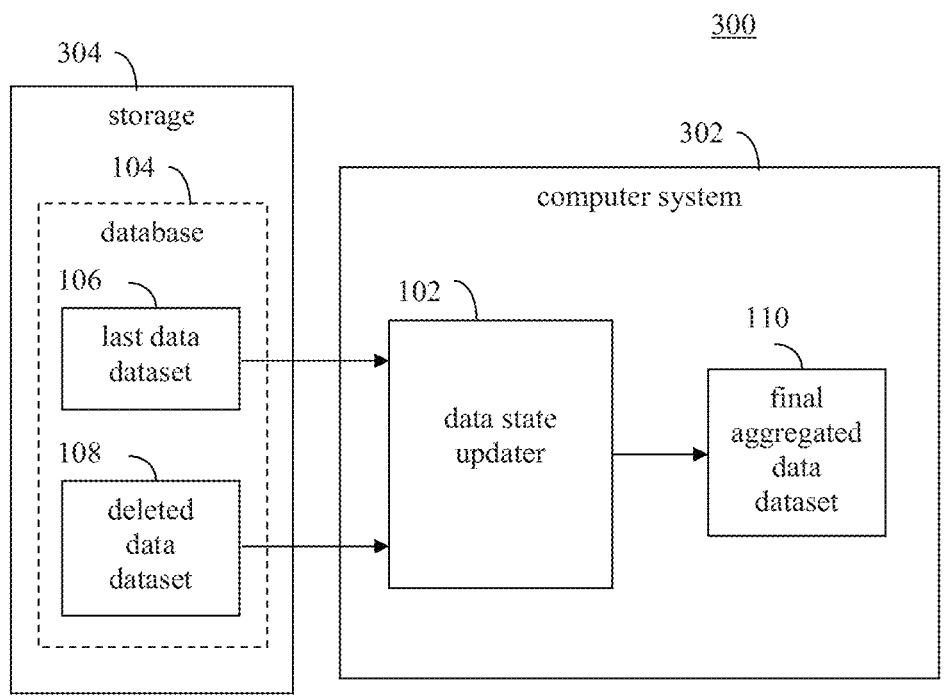
FIG. 3 shows a block diagram of a computer system containing a data state updater, according to an example embodiment.

System 100 of FIG. 1 may be configured in various ways, in embodiments. For instance, FIG. 3 shows a block diagram of a computer system 300 containing data state updater 102, according to an example embodiment. As shown in FIG. 3, data state updater 102 accesses storage 304 coupled to computer system 302 to retrieve last data dataset 106 and deleted data dataset 108 (optionally stored in database 104 in storage 304). In embodiments, last data dataset 106 and deleted data dataset 108 may be stored locally to computer system 300 (e.g., in storage 304 as shown in FIG. 3) and/or may be accessed remotely from computer system 300. As shown in FIG. 3, data state updater 102 generates final aggregated data dataset 110, which may be optionally stored in storage 304.

Storage 304 may include one or more of any type of storage mechanism to store data and/or code, including a magnetic disk (e.g., in a hard disk drive), an optical disc (e.g., in an optical disk drive), a magnetic tape (e.g., in a tape drive), a memory device such as a RAM device, a ROM device, etc., and/or any other suitable type of storage medium. Computer system 300 may be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a smart phone (e.g., an Apple iPhone, a Google Android™ phone, a Microsoft Windows® phone, etc.), or other type of computing device.

Note that FIG. 3 is provided for purposes of illustration, and in other embodiments, data state updater 102 may be implemented in other ways, as would be known to persons skilled in the relevant art(s) from the teachings herein.

Figure 4:
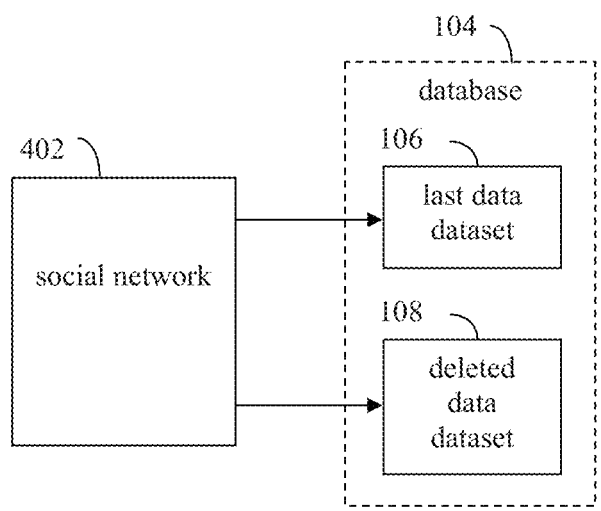
FIG. 4 shows a block diagram of a social network that generates a last data dataset and a deleted data dataset, according to an example embodiment.

As described above, various applications may generate data state information that may be updated periodically according to embodiments described herein. Examples of such applications include social networks (e.g., Facebook® operated by Facebook, Inc. of Palo Alto, Calif., Google+ operated by Google, Inc. of Mountain View, Calif.), electronic commerce websites (e.g., amazon.com, provided by Amazon.com, Inc. of Seattle, Wash., and ebay.com, provided by eBay Inc. of San Jose, Calif.), and/or any other types of websites or online properties that enable users to apply "like" and "unlike" indications, and/or other types of two-state data indications, to target objects. For example, FIG. 4 shows a block diagram of a social network 402 that generates last data dataset 106 and deleted data dataset 108, according to an example embodiment.

Figure 5:
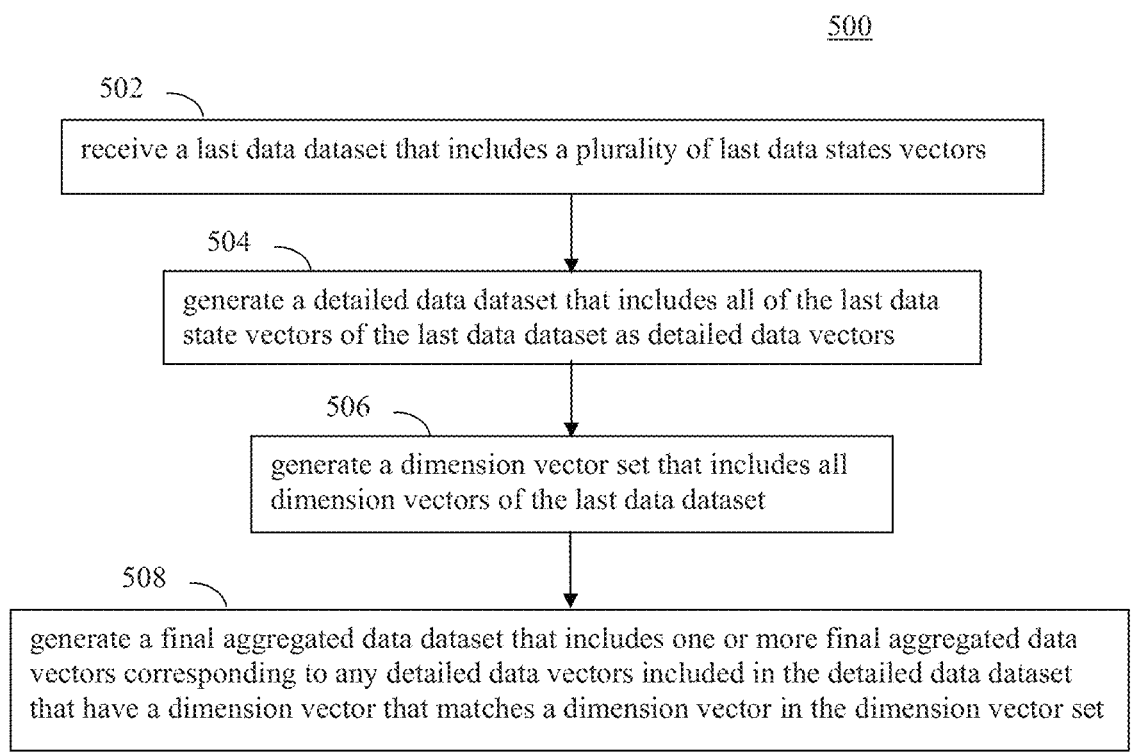
FIG. 5 shows a flowchart providing a process for updating an aggregation of data states for a first time period, according to an example embodiment.
Figure 6:
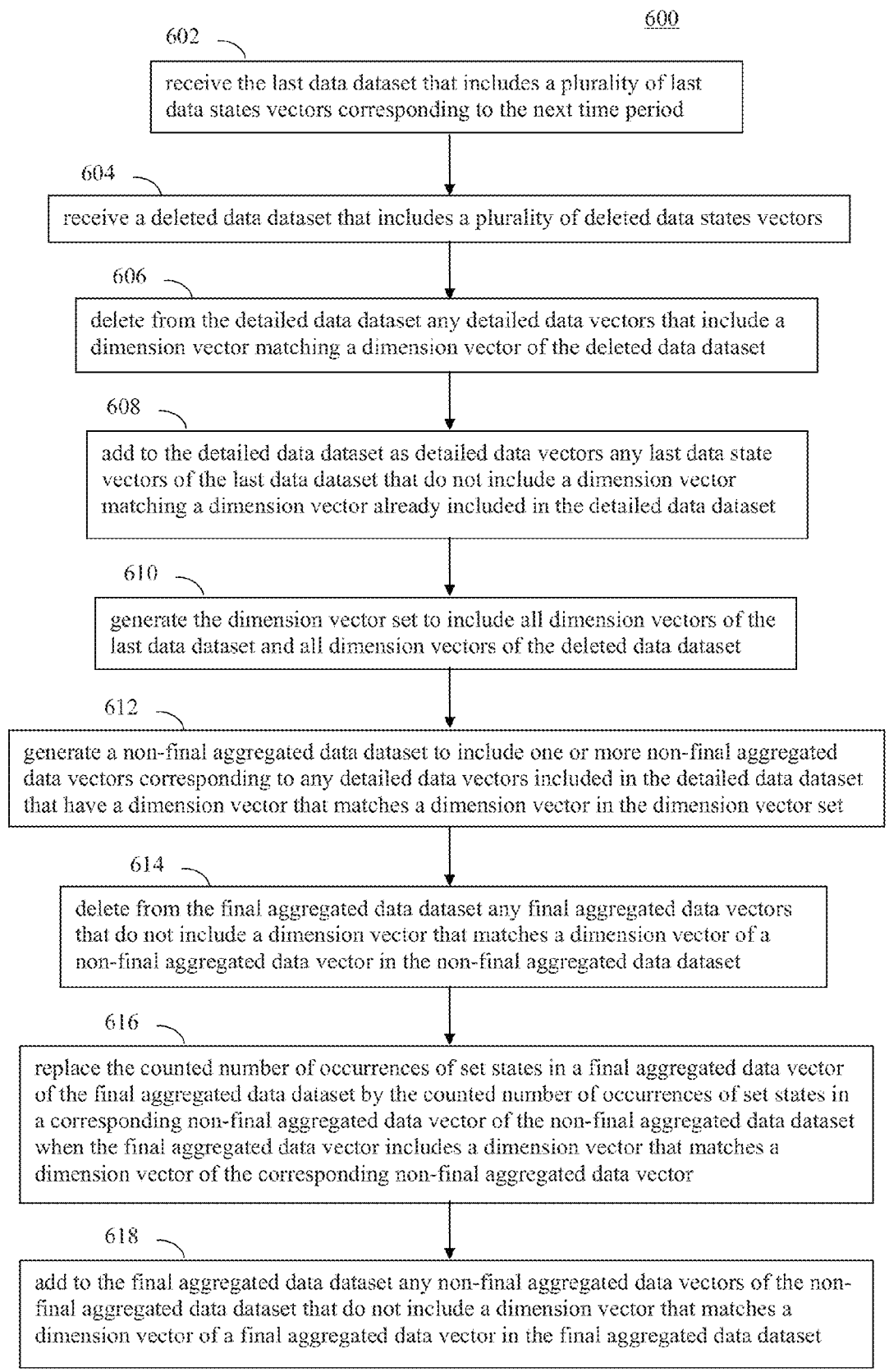
FIG. 6 shows a flowchart providing a process for updating the aggregation of data states for subsequent time periods, according to an example embodiment.

Data state updater 102 may be configured in various ways, and flowchart 200 may be performed in various ways, in embodiments. For instance, FIG. 5 shows a flowchart 500 providing a process for updating an aggregation of data states for a first time period, according to an example embodiment. In an embodiment, data state updater 102 may perform flowchart 500 to generate final aggregated data dataset 110 based on a first time period. Furthermore, FIG. 6 shows a flowchart 600 providing a process for updating the aggregation of data states for subsequent time periods, according to an example embodiment. In an embodiment, data state updater 102 may perform flowchart 600 to update final aggregated data dataset 110 based on time periods subsequent to the first time period.

Figure 7:
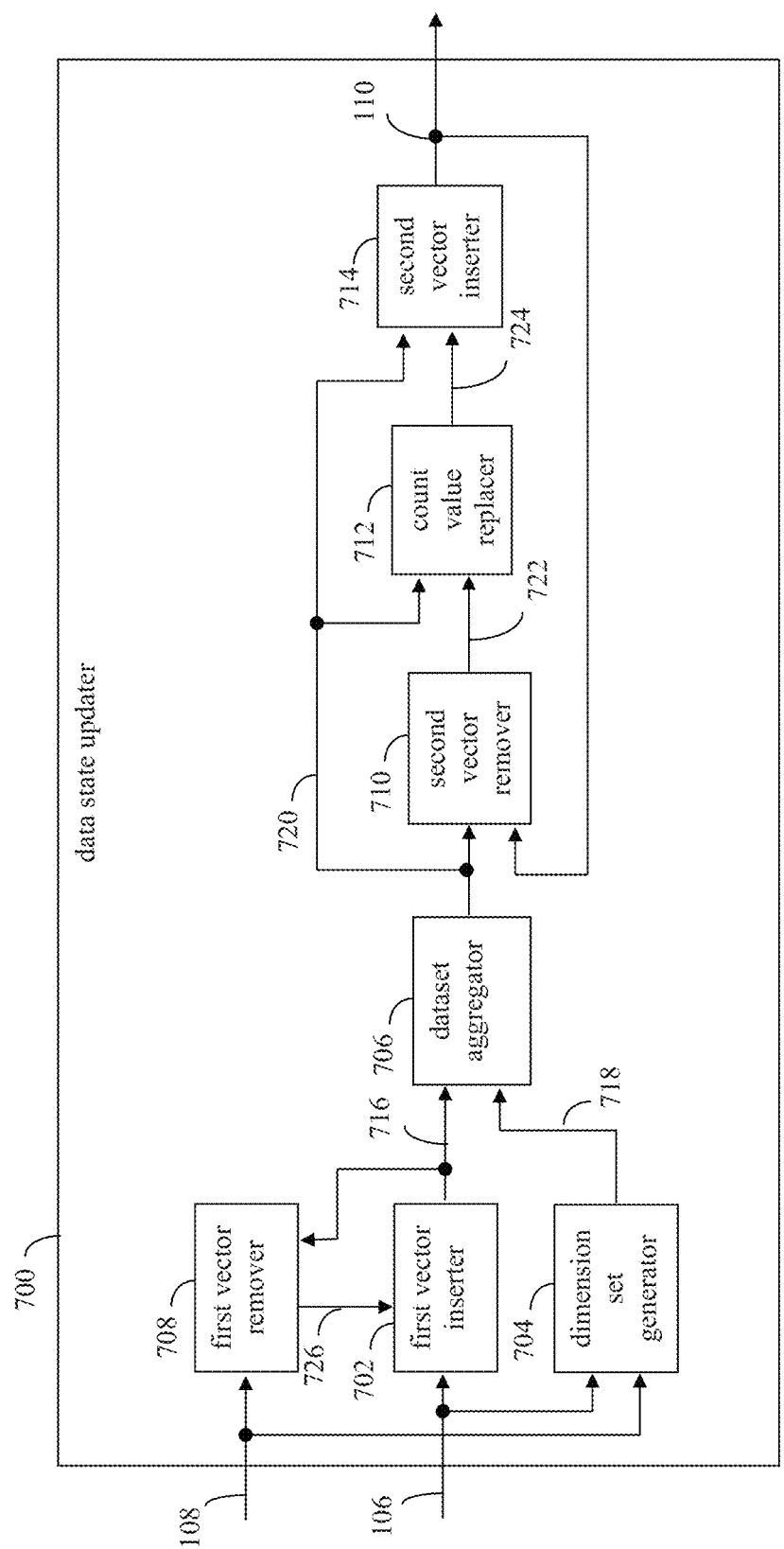
FIG. 7 shows a block diagram of a data state updater, according to an example embodiment.

Flowcharts 500 and 600 are described as follows with reference to FIG. 7. FIG. 7 shows a block diagram of a data state updater 700, according to an example embodiment. Data state updater 700 is an example embodiment of data state updater 102. As shown in FIG. 7, data state updater 700 includes a first vector inserter 702, a dimension set generator 704, a dataset aggregator 706, a first vector remover 708, a second vector remover 710, a count value replacer 712, and a second vector inserter 714. Further structural and operational embodiments will be apparent to persons skilled in the relevant art(s) based on the following discussion regarding flowcharts 500 and 600 and data state updater 700.

As mentioned above, flowchart 500 of FIG. 5 may performed for a first time period to generate final aggregated data dataset 110. Flowchart 500 begins with step 502. In step 502, a last data dataset (U) is received that includes a plurality of last data states vectors. As shown in FIG. 7, first vector inserter 702 may receive last data dataset 106. Last data dataset 106 may include a plurality of last data state vectors that indicate data states for one or more online objects. For instance, in an embodiment, each last data state vector of last data dataset 106 may include a data state value indicating a set state, a time at which the set state was indicated, and a dimension vector that identifies a user and a target object that was tagged with the set state by the user. Last data dataset 106 may include any number of last data state vectors, including tens, hundreds, thousands, or millions of last data state vectors. Such last data state vectors may be associated with any number of online objects and users.

In an embodiment, last data dataset 106 may be represented as a dataset U that contains a number r of last data state vectors u, shown as follows:

$$U = \begin{bmatrix} u_1 \\ \ldots \\ u_r \end{bmatrix}$$

where
$u_i = (t_i, d_i, s_i)$ for i=1 to r,
$s_i$=the data state value indicating a set state,
$t_i$=the time at which the set state was indicated,
$d_i$=the dimension vector that identifies a user and a target object that was tagged with the set state by the user.

Furthermore, deleted data dataset 108 may be represented as a dataset L that contains a number k of last data state vectors l, shown as follows:

$$L = \begin{bmatrix} l_1 \\ \ldots \\ l_k \end{bmatrix}$$

where
$l_j = (t_j, d_j, p_j)$ for =1 to k,
$p_j$=the data state value indicating a deleted state,
$t_j$=the time at which the deleted state was indicated,
$d_j$=the dimension vector that identifies a user and a target object that was tagged with the deleted state by the user.

For purposes of illustration, flowcharts 500 (FIG. 5) and 600 (FIG. 6) and data state updater 700 (FIG. 7) are described with respect to examples of user activity that result in example input datasets to be generated. For instance, in one illustrative example, the following user activity may have been performed during a first time period of 0-9 (e.g., seconds, minutes, hours, etc.). For ease of illustration, the following user activity is provided for three users (Users 1-3) that interacted with three online target objects (URLs 1-3) by providing respective combinations of "like" indications and/or "unlike" indications for the target objects:

User 1: liked URL 1 at time 1, unliked URL 1 at time 2, and liked URL 1 at time 4

User 2: liked URL 2 at time 1, unliked URL 2 at time 4

User 2: liked URL 1 at time 1, unliked URL 1 at time 2, liked URL 1 at time 3, and unliked URL 1 at time 5
User 2: liked URL 3 at time 6
User 1: liked URL 2 at time 6
User 3: liked URL 1 at time 6

As shown above, in the example, User 1 interacted with URL 1, providing a first "like" indication to URL 1 at time 1, an "unlike" indication to URL 1 at time 2, and a second "like" indication to URL 1 at time 4. User 2 interacted with URL 2, providing a "like" indication to URL 2, and an "unlike" indication to URL 2 at time 4. In a similar fashion, User 2 interacted with URL 1 and URL 3, User 1 interacted with URL 2, and User 3 interacted with URL 1.

For this above example of user activity, last data dataset 106 may contain the following last data state vectors u1 to u4 in the vector form of (time, dimension (user and target object), data state value):

u1=time 4, User 1 and URL 1, like
u2=time 6, User 2 and URL 3, like
u3=time 6, User 1 and URL 2, like
u4=time 6, User 3 and URL 1, like As shown for this example above, last data dataset 106 includes the last data state changes made by users to target objects that resulted in a set state (a "like" indication). This is an example of last data dataset 106 that may be received in step 502 of flowchart 500.

Also note that for this above example of user activity, deleted data dataset 108 may contain the following deleted data state vectors l1 to l4 in the vector form of (time, dimension (user and target object), data state value):

L1=time 2, User 1 and URL1, unlike
L2=time 4, User 2 and URL2, unlike
L3=time 2, User 2 and URL1, unlike
L4=time 5, User 2 and URL1, unlike As shown for this example above, deleted data dataset 108 includes any data state changes made by users to target objects that where set state deletions occur (deleting a "like" indication by unliking the target object). Note that this example of deleted data dataset 108 is provided for purposes of illustration, because flowchart 500 does not utilize deleted data dataset 108 when first generating an aggregation of data states.

Referring back to FIG. 5, in step 504, a detailed data dataset (V) is generated that includes all of the last data state vectors of the last data dataset as detailed data vectors. For example, in an embodiment, first vector inserter 702 may be configured to insert the last data state vectors of last data dataset 106 into a detailed data dataset as detailed data vectors. As shown in FIG. 5, first vector inserter 702 generates a detailed data dataset 716 that includes the detailed data vectors, which may have the form of (time, dimension (user and target object), data state value).

In an embodiment, detailed data dataset 716 may be represented as a dataset V that contains a number n of last data state vectors u, shown as follows:

$$V = \begin{bmatrix} v_1 \\ v_2 \\ ... \\ v_n \end{bmatrix}$$

where $v_i = (t_i, d_i, s_i)$ for i=1 to n.

Continuing the example from above, detailed data dataset 716 may contain the following detailed data vectors v1 to v4 in the vector form of (time, dimension (user and target object), data state value):

V (time, dimension (user and target), state)
v1=time 4, User 1 and URL 1, like
v2=time 6, User 2 and URL 3, like
v3=time 6, User 1 and URL 2, like
v4=time 6, User 3 and URL 1, like Referring back to FIG. 5, in step 506, a final aggregated data dataset is generated that includes one or more final aggregated data vectors corresponding to any detailed data vectors included in the detailed data dataset. In an embodiment, dataset aggregator 706 generates a non-final aggregated data dataset 720. The generated non-final aggregated data dataset 720 includes one or more non-final aggregated data vectors corresponding to any detailed data vectors included in detailed data dataset 716. In an embodiment, each non-final aggregated data vector in non-final aggregated data dataset 720 includes a dimension vector and a counted number of occurrences of set states for the dimension vector in detailed data dataset 716. Thus, in an embodiment, dataset aggregator 706 counts the occurrences of set states for the dimension vector in detailed data dataset 716, and includes the count value in non-final aggregated data dataset 720.

In an embodiment, non-final aggregated data dataset 720 may be represented as a set G that contains a number m of non-final aggregated data vectors "g", which each include a dimension vector E (user, target object) and a count value c, shown as follows:

$$G = \begin{bmatrix} g1 \\ g2 \\ ... \\ gm \end{bmatrix}$$

where $g_i = (E_i, c_i)$ for i=1 to m.

Continuing the example from above, non-final aggregated data dataset 720 may contain the following non-final aggregated data vectors g1 to g4 in the vector form of ((user and target object), count number):

g1=User 1 and URL 1, number of likes=1
g2=User 1 and URL 2, number of likes=1
g3=User 2 and URL 3, number of likes=1
g4=User 3 and URL 1, number of likes=1

In this example, each dimension vector of non-final aggregated data vectors g1 to g4 has a single number of occurrences of "like" indications in detailed data dataset 716, and as such, each of non-final aggregated data vectors g1 to g4 has a count value of "1" (number of likes 1) determined by dataset aggregator 706. Although embodiments are described herein in terms of "like" indications being used to tag objects, in other embodiments, other actions may be used to tag objects (e.g., providing a "friend" indication to an object, etc.).

Thus, dataset aggregator 706 generates non-final aggregated data dataset 720 in FIG. 7. Because this is the first time period, final aggregated data dataset 110 has not previously been generated. As such, non-final aggregated data dataset 720 is passed through second vector remover 710, count value replacer 712, and second vector inserter 714 to be output by data state updater 700 as final aggregated data dataset 110.

In an embodiment, final aggregated data dataset 110 may be represented as a set A that contains a number m of final aggregated data vectors "a", which each include a dimension vector E (user, target object) and a count value c, shown as follows:

$$A = \begin{bmatrix} a1 \\ a2 \\ \ldots \\ am \end{bmatrix}$$

where $a_i = (E_i, c_i)$ for i=1 to m.

Continuing the example from above, final aggregated data dataset 110 may contain the following final aggregated data vectors a1 to a4 in the vector form of ((user and target object), count number):

a1=User 1 and URL 1, number of likes=1
a2=User 1 and URL 2, number of likes=1
a3=User 2 and URL 3, number of likes=1
a4=User 3 and URL 1, number of likes=1

As mentioned above, after performing flowchart 500, flowchart 600 of FIG. 6 may be performed/repeated to update final aggregated data dataset 110 for subsequent changes to data states for target objects, for newly tagged target objects, etc., that occur in one or more subsequent time periods.

Flowchart 600 begins with step 602. In step 602, the last data dataset is received that includes a plurality of last data states vectors corresponding to the next time period. For example, as described above with respect to step 502 (FIG. 5), first vector inserter 702 of FIG. 7 may receive last data dataset 106. Last data dataset 106 may include a plurality of last data state vectors for one or more online objects having data state values that were changed to set during the time period. As described above, in an embodiment, each last data state vector of last data dataset 106 may include a data state value indicating a set state, a time at which the set state was indicated, and a dimension vector that identifies a user and a target object that was tagged with the set state by the user To continue and further illustrate the example from above, the following user activity may have been performed during the next (second) time period of 10-19:

User 1: unliked URL 1 at time 10
User 2: liked URL 2 at time 11
User 2: liked URL 1 at time 12, unliked URL 1 at time 13, liked URL 1 at time 14
User 2: unliked URL 3 at time 10, liked URL 3 at time 13, unliked URL 3 at time
User 3: liked URL 1 at time 11

As shown above, User 1 interacted with URL 1, providing an "unlike" indication to URL 1 at time 10. User 2 interacted with URL 2, providing a "like" indication to URL 2 at time 11. In a similar fashion, User 2 interacted with URL 1 and URL 3, and User 3 interacted with URL 1.

For this above example of user activity, last data dataset 106 may contain the following last data state vectors u1 to u3 in the vector form of (time, dimension (user and target object), data state value):

u1=time 11, User 2 and URL 2, like
u2=time 14, User 2 and URL 1, like
u3=time 11, User 3 and URL 1, like As shown for this example above, last data dataset 106 includes the last data state changes made by users to target objects that resulted in a set state (a "like" indication) during this time period. This is an example of last data dataset 106 that may be received in step 602 of flowchart 600.

Referring back to FIG. 6, in step 604, a deleted data dataset is received that includes a plurality of deleted data states vectors. In an embodiment, as shown in FIG. 7, first vector remover 708 may receive deleted data dataset 108. Deleted data dataset 108 may include a plurality of deleted data state vectors for one or more online objects having data state values that were changed to a deleted state during the time period. In an embodiment, each deleted data state vector may include a data state value indicating a deleted state, a time at which the deleted state was indicated, and a dimension vector that identifies a user and a target object that was tagged with the deleted state by the user.

Continuing the above example, deleted data dataset 108 may contain the following deleted data state vectors l1 and l2 in the vector form of (time, dimension (user and target object), data state value):

l1=time 10, User 1 and URL 1, unlike
l2=time 10, User 2 and URL 3, unlike

As shown for this example above, deleted data dataset 108 includes the changes to deleted state made by users to target objects (e.g., by an "unlike" indication) during this time period. This is an example of deleted data dataset 108 that may be received in step 604 of flowchart 600.

In step 606, any detailed data vectors that include a dimension vector matching a dimension vector of the deleted data dataset is/are deleted from the detailed data dataset. In an embodiment, first vector remover 708 may perform step 606. As shown in FIG. 7, first vector remover 708 receives detailed data dataset 716 (and deleted data dataset 108 in step 604). Detailed data dataset 716 is a version of detailed data dataset 716 generated during the prior time period iteration (e.g., flowchart 500 or flowchart 600). As such, first vector remover 708 may receive detailed data dataset 716 directly from first vector inserter 702 (as shown in FIG. 7) or from storage. First vector remover 708 is configured to compare detailed data dataset 716 with deleted data dataset 108, and to remove from detailed data dataset 716 any detailed data vectors that include a dimension vector matching a dimension vector of deleted data dataset 108.

For instance, continuing the above example, detailed data dataset 716 was last generated in step 504 of FIG. 5. First vector remover 708 may remove from this version of detailed data dataset 716 any detailed data vectors that include a dimension vector matching a dimension vector of deleted data dataset 108, which include v1 (matching dimension vector of User 1 and URL 1) and v2 (matching dimension vector of User 2 and URL 3), resulting in the following modified detailed data dataset:

v3=time 6, User 1 and URL 2, like
v4=time 6, User 3 and URL 1, like

As shown in FIG. 7, first vector remover 708 generates a reduced detailed data dataset 726, which is detailed data dataset 716 modified to remove the detailed data vectors having the matching dimension vectors with deleted data dataset 108.

In step 608, any last data state vectors of the last data dataset that do not include a dimension vector matching a dimension vector already included in the detailed data dataset is/are added to the detailed data dataset as detailed data vectors. In an embodiment, first vector inserter 702 may perform step 608. As shown in FIG. 7, first vector inserter 702 receives reduced detailed data dataset 726 (and last data dataset 106 in step 602). First vector inserter 702 is configured to compare reduced detailed data dataset 726 with last data dataset 106, and to add to reduced detailed data dataset 726 any last data state vectors that do not include a dimension vector matching a dimension vector already included in a detailed data vector of reduced detailed data dataset 726.

For instance, continuing the above example, first vector inserter 702 may insert into reduced detailed data dataset 726 any last data state vectors of last data dataset 106 that do not include a dimension vector matching a dimension vector already included in a detailed data vector of reduced detailed data dataset 726, which include u1 (dimension vector of User 1 and URL 2 not matching) and u2 (dimension vector of User 2 and URL 1 not matching). As such, detailed data dataset 716 may contain detailed data vectors v3 and v4 from before, and new detailed data vectors v5 and v6 (representing last data state vectors u1 and u2):

v3=time 6, User 1 and URL 2, like
v4=time 6, User 3 and URL 1, like
v5=time 11, User 2 and URL 2, like
v6=time 14, User 2 and URL 1, like As shown in FIG. 7, first vector inserter 702 generates detailed data dataset 716, which is reduced detailed data dataset 726 with any additional detailed data vectors added in step 608.

In step 610, the dimension vector set is generated to include all dimension vectors of the last data dataset and all dimension vectors of the deleted data dataset. As shown in FIG. 7, dimension set generator 704 receives last data dataset 106 and deleted data dataset 108. In an embodiment, dimension set generator 704 generates a dimension vector set 718 to include all of the dimension vectors of last data dataset 106 and of deleted data dataset 108.

In an embodiment, dimension vector set 718 may be represented as a set D that contains a number r of dimension vectors d, shown as follows:

$$D = \begin{bmatrix} d1 \\ d2 \\ ... \\ dr \end{bmatrix}$$

where $d_i = (user_i, target\ object_i)$ for i=1 to r.

For instance, continuing the example from above, dimension vector set 718 be generated by dimension set generator 704 to contain the following dimension vectors d1 to d5 in the vector form of (user and target object):

d1=User 1 and URL 1
d2=User 2 and URL 1
d3=User 2 and URL 2
d4=User 2 and URL 3
d5=User 3 and URL 1

In this example of dimension vector set 718, dimension vectors d1 and d4 are included from deleted data dataset 108, and dimension vectors d2, d3, and d5 are included from of last data dataset 106.

In step 612, a non-final aggregated data dataset is generated to include one or more non-final aggregated data vectors corresponding to any detailed data vectors included in the detailed data dataset that have a dimension vector that matches a dimension vector in the dimension vector set. In an embodiment, dataset aggregator 706 of FIG. 7 generates non-final aggregated data dataset 720. In step 612, non-final aggregated data dataset 720 includes one or more non-final aggregated data vectors corresponding to any detailed data vectors included in detailed data dataset 716 that have a dimension vector that matches a dimension vector in the dimension vector set 718. In an embodiment, each non-final aggregated data vector in non-final aggregated data dataset 720 includes a dimension vector that matched a dimension vector in dimension vector set 718 and a counted number of occurrences of set states for the dimension vector in detailed data dataset 716. Thus, in an embodiment, dataset aggregator 706 compares dimension vectors of detailed data vectors included in detailed data dataset 716 to dimension vector set 718. If a dimension vector of a detailed data vector matches a dimension vector of dimension vector set 718, dataset aggregator 706 includes the detailed data vector having the match in non-final aggregated data dataset 720. Furthermore, dataset aggregator 706 counts the occurrences of set states for the dimension vector in detailed data dataset 716, and includes the count value in non-final aggregated data dataset 720.

Continuing the example from above, non-final aggregated data dataset 720 may contain the following non-final aggregated data vectors g1 to g4 in the vector form of ((user and target object), count number):

g1=User 1 and URL 2, number of likes=1
g2=User 3 and URL 1, number of likes=1
g3=User 2 and URL 2, number of likes=1
g4=User 2 and URL 1, number of likes=1

In this example, each dimension vector of non-final aggregated data vectors g1 to g4 has a single number of occurrences of "like" indications in detailed data dataset 716, and as such, each of non-final aggregated data vectors g1 to g4 has a count value of "1" (number of likes 1) determined by dataset aggregator 706.

In step 614, any final aggregated data vectors that do not include a dimension vector that matches a dimension vector of a non-final aggregated data vector in the non-final aggregated data dataset is/are deleted from the final aggregated data dataset. In an embodiment, second vector remover 710 receives non-final aggregated data dataset 720 and final aggregated data dataset 110. Final aggregated data dataset 110 is a version of final aggregated data dataset 110 generated during the prior time period iteration (e.g., prior iteration of flowchart 500 or flowchart 600). As such, second vector remover 710 may receive final aggregated data dataset 110 directly from second vector inserter 714 (as shown in FIG. 7) or from storage. Second vector remover 710 is configured to compare non-final aggregated data dataset 720 with final aggregated data dataset 110, and to remove from final aggregated data dataset 110 any final aggregated data vectors that do not include a dimension vector matching a dimension vector of non-final aggregated data dataset 720.

As shown in FIG. 7, second vector remover 710 generates a reduced final aggregated data dataset 722, which is final aggregated data dataset 110 modified to remove the final aggregated data vectors not having matching dimension vectors with deleted data dataset 108.

For instance, continuing the above example, final aggregated data dataset 110 was last generated in step 508 of FIG. 5. Second vector remover 710 may remove from this version of final aggregated data dataset 110 any final aggregated data vectors that do not include a dimension vector matching a dimension vector of non-final aggregated data dataset 720, which in this example includes a1 (dimension vector of User 1 and URL 1 not matching) and a3 (dimension vector of User 2 and URL 3 not matching), resulting in the following reduced final aggregated data dataset 722:

a2=User 1 and URL 2, number of likes=1
a4=User 3 and URL 1, number of likes=1

In step 616, the counted number of occurrences of set states in a final aggregated data vector of the final aggregated data dataset is replaced by the counted number of occurrences of set states in a corresponding non-final aggregated data vector of the non-final aggregated data dataset when the final aggregated data vector includes a dimension vector that matches a dimension vector of the corresponding non-final aggregated data vector. In an embodiment, as shown in FIG. 7, count value replacer 712 receives non-final aggregated data dataset 720 and reduced final aggregated data dataset 722. Count value replacer 712 is configured to compare non-final aggregated data dataset 720 and reduced final aggregated data dataset 722, and to replace the counted number of occurrences of set states for final aggregated data vectors in reduced final aggregated data dataset 722 with the corresponding counted number of occurrences of set states for non-final aggregated data vectors in non-final aggregated data dataset 720 when their dimension vectors match.

As shown in FIG. 7, count value replacer 712 generates a modified final aggregated data dataset 724, which is reduced final aggregated data dataset 722 with any count value modifications.

For instance, continuing the above example, count value replacer 712 may compare the above examples of non-final aggregated data dataset 720 and reduced final aggregated data dataset 722 to determine that the dimension vectors of non-final aggregated data vector g1 and final aggregated data vector a2 match, and that the dimension vectors of non-final aggregated data vector g2 and final aggregated data vector a4 match. As such, count value replacer 712 may replace the count value of final aggregated data vector a2 ("1") with the count value of non-final aggregated data vector g1 ("1"), and may replace the count value of final aggregated data vector a4 ("1") with the count value of non-final aggregated data vector g2 ("1"). This may result in the following reduced final aggregated data dataset 722:

a2=User 1 and URL 2, number of likes=1
a4=User 3 and URL 1, number of likes=1

In this example, the count values are the same, and as such, the count values of final aggregated data vectors a2 and a4 do not appear to change.

In embodiments where dimension vectors include user and target object, and where no user can "like" a target object more than one time, the count values of numbers of likes have a maximum value of one. It is noted that in other embodiments, users may "like" a target object more than one time, and in such case, the count values of numbers of likes may have values greater than one. Furthermore, in other embodiments, dimension vectors may not include a user (e.g., may just include the target object) and/or may have alternative contents, and in such embodiments, the count values of numbers of "likes" may have values greater than one.

In step 618, any non-final aggregated data vectors of the non-final aggregated data dataset that do not include a dimension vector that matches a dimension vector of a final aggregated data vector in the final aggregated data dataset is/are added to the final aggregated data dataset. In an embodiment, as shown in FIG. 7, second vector inserter 714 receives modified final aggregated data dataset 724 and non-final aggregated data dataset 720. Second vector inserter 714 is configured to compare non-final aggregated data dataset 720 and modified final aggregated data dataset 724, and to add to modified final aggregated data dataset 724 any non-final aggregated data vectors of non-final aggregated data dataset 720 that do not include a dimension vector that matches a dimension vector of a final aggregated data vector in modified final aggregated data dataset 724.

As shown in FIG. 7, second vector inserter 714 generates final aggregated data dataset 110, which is modified final aggregated data dataset 724 with any non-final aggregated data vectors of non-final aggregated data dataset 720 not having matching dimension vectors in modified final aggregated data dataset 724 added as final aggregated data vectors.

For instance, continuing the above example, second vector inserter 714 may compare the above examples of non-final aggregated data dataset 720 and modified final aggregated data dataset 724 to determine that the dimension vectors of non-final aggregated data vector g3 and g4 do not have matches in modified final aggregated data dataset 724. As such, second vector inserter 714 may add non-final aggregated data vectors g3 and g4 to and modified final aggregated data dataset 724 as new final aggregated data vectors a5 and a6. This may result in the following final aggregated data dataset 110:

a2=User 1 and URL 2, number of likes=1
a4=User 3 and URL 1, number of likes=1
a5=User 2 and URL 2, number of likes=1
a6=User 2 and URL 1, number of likes=1

It is noted that flowchart 500 may be considered to be a special case of flowchart 600. For instance, where detailed data dataset 716 (V) is empty and final aggregated data dataset 110 (A) has not yet been generated (e.g., during a first time period, when flowchart 600 is being first performed), flowchart 600 may be performed by clearing (setting to empty) deleted data dataset 108. In such case, steps 604 and 606 of flowchart 600 are not performed (because deleted data dataset 108 is empty) and steps 614-618 are not performed (because detailed data dataset 716 is empty), resulting in final aggregated data dataset 110 being set to non-final aggregated data dataset 720 (G) generated in step 612.

Furthermore, note that flowcharts 500 and 600 may be re-written in terms of the dataset and vector labels described above (e.g., last data dataset U, etc.). For instance, flowcharts 500/600 may be performed in a combined manner according to the following process for user activity during a first time period:

(a) receive dataset U, which contains r vectors;
(b) If dataset V is empty, set dataset L to empty. If dataset V is not empty, retrieve dataset L, which contains k vectors;
(c) Delete all the vectors v in dataset V, where the vector v has a match of dimension vector d in dataset L;
(d) Add all of the vectors u in dataset U to dataset V where there is no match of dimension vector d in dataset V;
(e) Determine all of the dimension vectors d in datasets U and L, and insert the determined dimension vectors into a dataset D;
(f) Aggregate all the data in dataset V having a match in dataset V, and enter the aggregated data into a dataset G;
(g) Delete all the vectors "a" in dataset A where there is no match of dimension vector E in dataset G;
(h) Replace the count value c in dataset A by the count value c in a corresponding vector in dataset G having a match of dimension vector E in dataset G; and
(i) Add all the vectors g in dataset G to dataset A where there is no match of dimension vector E in dataset A.

Furthermore, this process may be repeated one or more times for user activity in subsequent time periods.

III Example Computing Device Embodiments

Data state updater 102, social network 402, data state updater 700, first vector inserter 702, dimension set generator 704, dataset aggregator 706, first vector remover 708, second vector remover 710, count value replacer 712, second vector inserter 714, flowchart 200, flowchart 500, and flowchart 600 may be implemented in hardware, software, firmware, or any combination thereof. For example, data state updater 102, social network 402, data state updater 700, first vector inserter 702, dimension set generator 704, dataset aggregator 706, first vector remover 708, second vector remover 710, count value replacer 712, second vector inserter 714, flowchart 200, flowchart 500, and/or flowchart 600 may be implemented as computer program code configured to be executed in one or more processors. Alternatively, data state updater 102, social network 402, data state updater 700, first vector inserter 702, dimension set generator 704, dataset aggregator 706, first vector remover 708, second vector remover 710, count value replacer 712, second vector inserter 714, flowchart 200, flowchart 500, and/or flowchart 600 may be implemented as hardware logic/electrical circuitry. For instance, in an embodiment, one or more of data state updater 102, social network 402, data state updater 700, first vector inserter 702, dimension set generator 704, dataset aggregator 706, first vector remover 708, second vector remover 710, count value replacer 712, second vector inserter 714, flowchart 200, flowchart 500, and/or flowchart 600 may be implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
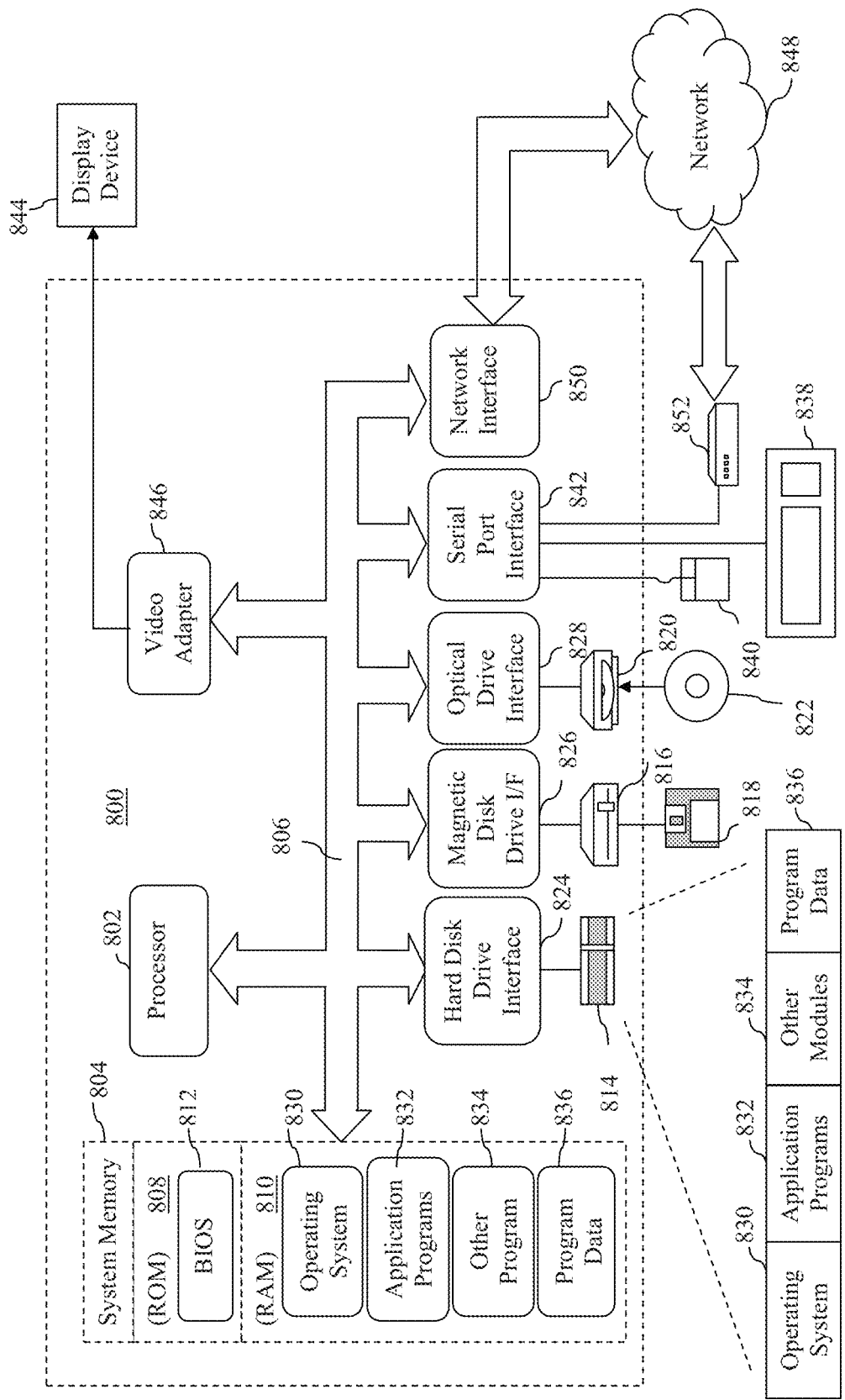
FIG. 8 shows a block diagram of an example computer that may be used to implement embodiments of the present invention.

FIG. 8 depicts an exemplary implementation of a computer 800 in which embodiments of the present invention may be implemented. For example, computer system 302 may be implemented in a computer system similar to computer 800, including one or more features of computer 800 and/or alternative features. Computer 800 may be a general-purpose computing device in the form of a conventional personal computer, a mobile computer, a server, or a workstation, for example, or computer 800 may be a special purpose computing device. The description of computer 800 provided herein is provided for purposes of illustration, and is not intended to be limiting. Embodiments of the present invention may be implemented in further types of computer systems, as would be known to persons skilled in the relevant art(s).

As shown in FIG. 8, computer 800 includes one or more processors 802, a system memory 804, and a bus 806 that couples various system components including system memory 804 to processor 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic (e.g., computer program code) for implementing data state updater 102, social network 402, data state updater 700, first vector inserter 702, dimension set generator 704, dataset aggregator 706, first vector remover 708, second vector remover 710, count value replacer 712, second vector inserter 714, flowchart 200, flowchart 500, and/or flowchart 600 (including any step of flowcharts 200, 500, and 600), and/or further embodiments described herein.

A user may enter commands and information into the computer 800 through input devices such as keyboard 838 and pointing device 840. Other input devices (not shown) may include a microphone, joystick, game pad, satellite dish, scanner, or the like. These and other input devices are often connected to processor 802 through a serial port interface 842 that is coupled to bus 806, but may be connected by other interfaces, such as a parallel port, game port, or a universal serial bus (USB).

A display device 844 is also connected to bus 806 via an interface, such as a video adapter 846. In addition to the monitor, computer 800 may include other peripheral output devices (not shown) such as speakers and printers.

Computer 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to generally refer to media such as the hard disk associated with hard disk drive 814, removable magnetic disk 818, removable optical disk 822, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850, serial port interface 842, or any other interface type. Such computer programs, when executed or loaded by an application, enable computer 800 to implement features of embodiments of the present invention discussed herein. Accordingly, such computer programs represent controllers of the computer 800.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for updating an aggregation of data states, comprising:
   performing for a first time period
   receiving a last data dataset that includes a plurality of last data states vectors, each last data state vector including a data state value indicating a set state, a time at which the set state was indicated, and a dimension vector that identifies a user and a target object that was tagged with the set state by the user,
   generating a detailed data dataset that includes all of the last data state vectors of the last data dataset as detailed data vectors, and
   generating a final aggregated data dataset that includes one or more final aggregated data vectors corresponding to any detailed data vectors included in the detailed data dataset, each final aggregated data vector including the dimension vector of a corresponding detailed data vector and a counted number of occurrences of set states for the dimension vector in the detailed data dataset;
   performing for a next time period
   receiving the last data dataset that includes a plurality of last data states vectors corresponding to the next time period,
   receiving a deleted data dataset that includes a plurality of deleted data states vectors, each deleted data state vector including a data state value indicating a deleted state, a time at which the deleted state was indicated, and a dimension vector that identifies a user and a target object that was tagged with the deleted state by the user;
   deleting from the detailed data dataset any detailed data vectors that include a dimension vector matching a dimension vector of the deleted data dataset,
   adding to the detailed data dataset as detailed data vectors any last data state vectors of the last data dataset that do not include a dimension vector matching a dimension vector already included in the detailed data dataset,
   generating a dimension vector set to include all dimension vectors of the last data dataset and all dimension vectors of the deleted data dataset,
   generating a non-final aggregated data dataset to include one or more non-final aggregated data vectors corresponding to any detailed data vectors included in the detailed data dataset that have a dimension vector that matches a dimension vector in the dimension vector set, each non-final aggregated data vector including a dimension vector that matched a dimension vector in the dimension vector set and a counted number of occurrences of set states for the dimension vector in the detailed data dataset,
   deleting from the final aggregated data dataset any final aggregated data vectors that do not include a dimension vector that matches a dimension vector of a non-final aggregated data vector in the non-final aggregated data dataset,
   replacing the counted number of occurrences of set states in a final aggregated data vector of the final aggregated data dataset by the counted number of occurrences of set states in a corresponding non-final aggregated data vector of the non-final aggregated data dataset when the final aggregated data vector includes a dimension vector that matches a dimension vector of the corresponding non-final aggregated data vector, and
   adding to the final aggregated data dataset any non-final aggregated data vectors of the non-final aggregated data dataset that do not include a dimension vector that matches a dimension vector of a final aggregated data vector in the final aggregated data dataset.

2. The method of claim 1, further comprising:
   repeating said performing for a next time period for at least one additional time period.

3. The method of claim 1, wherein the target object that was tagged with the deleted state is a link, an image file, a video object, an audio object, a person object, or a textual object.

4. The method of claim 1, wherein the set state is a like indication or a friend indication, and the deleted state is a removal of the like indication or the friend indication.

5. The method of claim 1, wherein said receiving a last data dataset comprises:
   receiving the last data dataset and the deleted data dataset from a database that stores data for a social network.

6. The method of claim 1, wherein the target object that was tagged with the set state is a link, an image file, a video object, an audio object, a person object, or a textual object.

7. A system for updating an aggregation of data states, comprising:
   at least one computer processor; and
   a computer memory associated with the at least one computer processor, the computer memory storing program code for execution by the at least one computer processor, the program code including:

a first vector inserter; and a dataset aggregator;

wherein, for a first time period, the first vector inserter receives a last data dataset that includes a plurality of last data states vectors, each last data state vector including a data state value indicating a set state, a time at which the set state was indicated, and a dimension vector that identifies a user and a target object that was tagged with the set state by the user, the first vector inserter generates a detailed data dataset that includes all of the last data state vectors of the last data dataset as detailed data vectors, and the dataset aggregator generates a final aggregated data dataset that includes one or more final aggregated data vectors corresponding to any detailed data vectors included in the detailed data dataset, each final aggregated data vector including the dimension vector of a corresponding detailed data vector and a counted number of occurrences of set states for the dimension vector in the detailed data dataset;

the program code further comprising:

a first vector remover;

a dimension set generator;

a second vector remover;

a count value replacer; and a second vector inserter;

wherein for a next time period, the first vector inserter receives the last data dataset that includes a plurality of last data states vectors corresponding to the next time period, the first vector remover receives a deleted data dataset that includes a plurality of deleted data states vectors, each deleted data state vector including a data state value indicating a deleted state, a time at which the deleted state was indicated, and a dimension vector that identifies a user and a target object that was tagged with the deleted state by the user, the first vector remover deletes from the detailed data dataset any detailed data vectors that include a dimension vector matching a dimension vector of the deleted data dataset, the first vector inserter adds to the detailed data dataset as detailed data vectors any last data state vectors of the last data dataset that do not include a dimension vector matching a dimension vector already included in the detailed data dataset, the dimension set generator generates a dimension vector set to include all dimension vectors of the last data dataset and all dimension vectors of the deleted data dataset, the dataset aggregator generates a non-final aggregated data dataset to include one or more non-final aggregated data vectors corresponding to any detailed data vectors included in the detailed data dataset that have a dimension vector that matches a dimension vector in the dimension vector set, each non-final aggregated data vector including a dimension vector that matched a dimension vector in the dimension vector set and a counted number of occurrences of set states for the dimension vector in the detailed data dataset, the second vector remover deletes from the final aggregated data dataset any final aggregated data vectors that do not include a dimension vector that matches a dimension vector of a non-final aggregated data vector in the non-final aggregated data dataset, the count value replacer replaces the counted number of occurrences of set states in a final aggregated data vector of the final aggregated data dataset by the counted number of occurrences of set states in a corresponding non-final aggregated data vector of the non-final aggregated data dataset when the final aggregated data vector includes a dimension vector that matches a dimension vector of the corresponding non-final aggregated data vector, and the second vector inserter adds to the final aggregated data dataset any non-final aggregated data vectors of the non-final aggregated data dataset that do not include a dimension vector that matches a dimension vector of a final aggregated data vector in the final aggregated data dataset.

8. The system of claim 7, wherein the target object that was tagged with the deleted state is a link, an image file, a video object, an audio object, a person object, or a textual object.

9. The system of claim 7, wherein the set state is a like indication or a friend indication, and the deleted state is a removal of the like indication or the friend indication.

10. The system of claim 7, wherein the last data dataset and the deleted data dataset are received from a database that stores data for a social network.

11. The system of claim 7, wherein the target object that was tagged with the set state is a link, an image file, a video object, an audio object, a person object, or a textual object.

12. A computer readable storage medium having computer readable logic embodied in said computer readable storage medium for enabling a processor to update an aggregation of data states, comprising:

a first computer readable logic; and a second computer readable logic;

wherein, for a first time period, the first computer readable logic enables the processor to receive a last data dataset that includes a plurality of last data states vectors, each last data state vector including a data state value indicating a set state, a time at which the set state was indicated, and a dimension vector that identifies a user and a target object that was tagged with the set state by the user, the first computer readable logic enables the processor to generate a detailed data dataset that includes all of the last data state vectors of the last data dataset as detailed data vectors, and the second computer readable logic enables the processor to generate a final aggregated data dataset that includes one or more final aggregated data vectors corresponding to any detailed data vectors included in the detailed data dataset, each final aggregated data vector including the dimension vector of a corresponding detailed data vector and a counted number of occurrences of set states for the dimension vector in the detailed data dataset;

the computer readable logic further comprising:

a third computer readable logic;

a fourth computer readable logic;

a fifth computer readable logic;

a sixth computer readable logic; and a seventh computer readable logic;

wherein for a next time period, the last data dataset that includes a plurality of last data states vectors corresponding to the next time period is received, a deleted data dataset is received that includes a plurality of deleted data states vectors, each deleted data state vector including a data state value indicating a deleted state, a time at which the deleted state was indicated, and a dimension vector that identifies a user and a target object that was tagged with the deleted state by the user, the third computer readable logic enables the processor to delete from the detailed data dataset any detailed data vectors that include a dimension vector matching a dimension vector of the deleted data dataset, the first computer readable logic enables the processor to add to the detailed data dataset as detailed data vectors any last data state vectors of the last data dataset that do not include a dimension vector matching a dimension vector already included in the detailed data dataset, the fourth computer readable logic enables the processor to generate a dimension vector set to include all dimension vectors of the last data dataset and all dimension vectors of the deleted data dataset, the second computer readable logic enables the processor to generate a non-final aggregated data dataset to include one or more non-final aggregated data vectors corresponding to any detailed data vectors included in the detailed data dataset that have a dimension vector that matches a dimension vector in the dimension vector set, each non-final aggregated data vector including a dimension vector that matched a dimension vector in the dimension vector set and a counted number of occurrences of set states for the dimension vector in the detailed data dataset, the fifth computer readable logic enables the processor to delete from the final aggregated data dataset any final aggregated data vectors that do not include a dimension vector that matches a dimension vector of a non-final aggregated data vector in the non-final aggregated data dataset, the sixth computer readable logic enables the processor to replace the counted number of occurrences of set states in a final aggregated data vector of the final aggregated data dataset by the counted number of occurrences of set states in a corresponding non-final aggregated data vector of the non-final aggregated data dataset when the final aggregated data vector includes a dimension vector that matches a dimension vector of the corresponding non-final aggregated data vector, and the seventh computer readable logic enables the processor to add to the final aggregated data dataset any non-final aggregated data vectors of the non-final aggregated data dataset that do not include a dimension vector that matches a dimension vector of a final aggregated data vector in the final aggregated data dataset.

13. The computer readable storage medium of claim 12, wherein the target object that was tagged with the deleted state is a link, an image file, a video object, an audio object, a person object, or a textual object.

14. The computer readable storage medium of claim 12, wherein the set state is a like indication or a friend indication, and the deleted state is a removal of the like indication or the friend indication.

15. The computer readable storage medium of claim 12, wherein the last data dataset and the deleted data dataset are received from a database that stores data for a social network.

16. The computer readable storage medium of claim 12, wherein the target object that was tagged with the set state is a link, an image file, a video object, an audio object, a person object, or a textual object.

* * * * *